United States Patent
Doi et al.

(10) Patent No.: US 7,450,009 B2
(45) Date of Patent: Nov. 11, 2008

(54) WIRELESS TAG READER, WIRELESS TAG SYSTEM, COMPUTER READABLE MEDIUM AND WIRELESS COMMUNICATION METHOD

(75) Inventors: Yusuke Doi, Yokohama (JP); Satoshi Ozaki, Kawasaki (JP); Shirou Wakayama, Kawasaki (JP); Masahiro Ishiyama, Kawasaki (JP); Toshiyuki Umeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 11/377,256

(22) Filed: Mar. 17, 2006

(65) Prior Publication Data

US 2006/0220790 A1 Oct. 5, 2006

(30) Foreign Application Priority Data

Mar. 22, 2005 (JP) ............................. 2005-081605

(51) Int. Cl.
*G08B 13/14* (2006.01)
(52) U.S. Cl. ................................................. 340/572.1
(58) Field of Classification Search ............... 340/572.1
See application file for complete search history.

(56) References Cited

U.S. PATENT DOCUMENTS

| 6,456,191 B1 * | 9/2002 | Federman .................. 340/10.2 |
| 2005/0018668 A1 * | 1/2005 | Cheriton ..................... 370/389 |
| 2005/0237194 A1 * | 10/2005 | VoBa ....................... 340/572.1 |
| 2006/0044115 A1 | 3/2006 | Doi et al. |

* cited by examiner

*Primary Examiner*—Jeff Hofsass
*Assistant Examiner*—Kerri L McNally
(74) *Attorney, Agent, or Firm*—Oblon, Spivak, McClelland, Maier & Neustadt, P.C.

(57) ABSTRACT

There is provided with a wireless tag reader communicating with a plurality of wireless tags each of which retains tag information piece and a bloom filter, the wireless tag reader comprising: a transmitter configured to transmit a read request signal simultaneously to the wireless tags to request the wireless tags to read out the bloom filters; a receiver configured to receive bloom filter signals simultaneously from the wireless tags to acquire a colliding bloom filter signal; a decoder configured to decode the colliding bloom filter signal to acquire a composite bloom filter which is equivalent to logic operation OR on the bloom filters; a data storage configured to store tag information pieces; and a filter verifier configured to verify each of tag information pieces in the data storage with the composite bloom filter to detect tag information pieces for which a verification result is positive or negative.

19 Claims, 4 Drawing Sheets

WIRELESS TAG READER, WIRELESS TAG SYSTEM, COMPUTER READABLE MEDIUM AND WIRELESS COMMUNICATION METHOD

CROSS-REFERENCE TO RELATED APPLICATIONS

This application claims the benefit of priority under 35USC §119 to Japanese Patent Application No. 2005-81605 filed on Mar. 22, 2005, the entire contents of which are incorporated herein by reference.

BACKGROUND OF THE INVENTION

1. Field of the Invention

The present invention relates to a wireless tag reader, a wireless tag system, a computer readable medium and a wireless communication method.

2. Related Art

In recent years, introduction of wireless tag systems has increased to efficiently manage commodities. In the wireless tag system, RF-ID tags respectively embedded in commodities and a reader/writer which reads out data from the RF-ID tags are used. If responses are sent simultaneously from a plurality of RF-ID tags when the reader/writer reads out data, collision between data occurs.

As conventional anti-collision technique, the ALOHA system and binary search are prominent.

The ALOHA system will now be described. If the reader/writer detects collision in response signals to a query sent to RF-ID tags, the reader/writer sends queries with conditions narrowed down in order from the most significant bit (MSB) of tag IDs in RF-ID tags. This is repeated until the condition that only one of RF-ID tags causing collision reacts is satisfied. This ALOHA system has a feature that a logic circuit to be mounted on the RF-ID tag is simple. In this system, however, a procedure of narrowing down using a plurality of steps is conducted until simultaneously reacting RF-ID tags are narrowed down to one tag. This results in a drawback that it takes much time in reading if the number of steps increases.

On the other hand, the binary search can be applied to an encoding scheme in which when RF-ID tags having different tag IDs simultaneously response, only a difference portion (a portion having different bit values) in the tag ID can be detected by the reader/writer as a collision signal and a common portion (a portion having the same bit value) can be read out as it is. For example, in the case of Manchester coding, collision can be detected when 0 and 1 are transmitted simultaneously. Also in the case where the binary search is used, there is a drawback that it takes much time in reading if the number of steps increases.

Besides, there is Japanese Patent Application Laid-Open Publication (JP-A) No. 2004-62665 as a document showing the conventional anti-collision technique.

An anti-collision mechanism described in JP-A-2004-62665 implements an anti-collision function using a simple algorithm of shifting a response slot start position of an RF-ID tag when collision has occurred, on the basis of the conventional algorithm (JIS-X6323-3, ISO/IEC15693-3). If simply the slot is shifted, there is a possibility that collision occurs again. However, in the JP-A-2004-62665, it is described that if there is a sufficient ID space (56 bits or more in the description of JP-A-2004-62665) the possibility of recurrence of collision is low and a tag ID can be acquired after several attempts.

Even if this technique described in JP-A-2004-62665 is used, however, only one tag ID can be acquired after several attempts. Therefore, there is a problem that a lot of time is needed to acquire tag IDs from all RF-ID tags in a detectable area by the reader/writer, i.e., to detect all RF-ID tags existing in the detectable area.

SUMMARY OF THE INVENTION

According to an aspect of the present invention, there is provided with a wireless tag reader communicating with a plurality of wireless tags each of which retains tag information piece and a bloom filter generated from the tag information piece on the basis of a bloom filter algorithm, the wireless tag reader comprising: a transmitter configured to transmit a read request signal simultaneously to the wireless tags to request the wireless tags to read out the bloom filters; a receiver configured to receive bloom filter signals simultaneously from the wireless tags to acquire a colliding bloom filter signal; a decoder configured to decode the colliding bloom filter signal to acquire a composite bloom filter signal which is equivalent to logic operation OR on the bloom filters; a data storage configured to store tag information pieces; and a filter verifier configured to verify each of tag information pieces in the data storage with the composite bloom filter to detect tag information pieces for which a verification result is positive or negative.

According to an aspect of the present invention, there is provided with a wireless tag system comprising a plurality of wireless tags and a wireless tag reader communicating with the wireless tags, each of the wireless tags including: a memory configured to store tag information piece and a bloom filter generated from the tag information piece by using a bloom filter algorithm; and a responder configured to, in response to a read request signal sent from the wireless tag reader, code the bloom filter stored in the memory by using a certain coding scheme to generate a bloom filter signal, and transmits the generated bloom filter signal to the wireless tag reader, and the wireless tag reader including: a transmitter configured to transmit a read request signal simultaneously to the wireless tags to request the wireless tags to read out the bloom filters; a receiver configured to receive bloom filter signals simultaneously from the wireless tags to acquire a colliding bloom filter signal; a decoder configured to decode the colliding bloom filter signal to acquire a composite bloom filter which is equivalent to logic operation OR on the bloom filters; a data storage configured to store tag information pieces; and a filter verifier configured to verify each of tag information pieces in the data storage with the composite bloom filter to detect tag information pieces for which a verification result is positive or negative.

According to an aspect of the present invention, there is provided with a computer readable medium storing a computer program for causing a computer, capable of communicating with a plurality of wireless tags each of which retains tag information piece and a bloom filter generated from the tag information piece on the basis of a bloom filter algorithm to execute instructions, to perform steps of: transmitting a read request signal simultaneously to the wireless tags to request the wireless tags to read out the bloom filters; receiving bloom filter signals simultaneously from the wireless tags to acquire a colliding bloom filter signal; decoding the colliding bloom filter signal to acquire a composite bloom filter which is equivalent to logic operation OR on the bloom filters; and verifying previously given tag information pieces with the composite bloom filter to detect tag information pieces for which a verification result is positive or negative.

According to an aspect of the present invention, there is provided with a wireless communication method used to communicate with a plurality of wireless tags each of which retains tag information piece and a bloom filter generated from the tag information piece on the basis of a bloom filter algorithm, the wireless communication method comprising: transmitting a read request signal simultaneously to the wireless tags; receiving bloom filter signals simultaneously from the wireless tags to acquire a colliding bloom filter signal; decoding the colliding bloom filter signal to acquire a composite bloom filter which is equivalent to logic operation OR on the bloom filters; and verifying previously given tag information pieces with the composite bloom filter to detect tag information pieces for which a verification result is positive or negative.

DETAILED DESCRIPTION OF THE INVENTION

Figure 1:
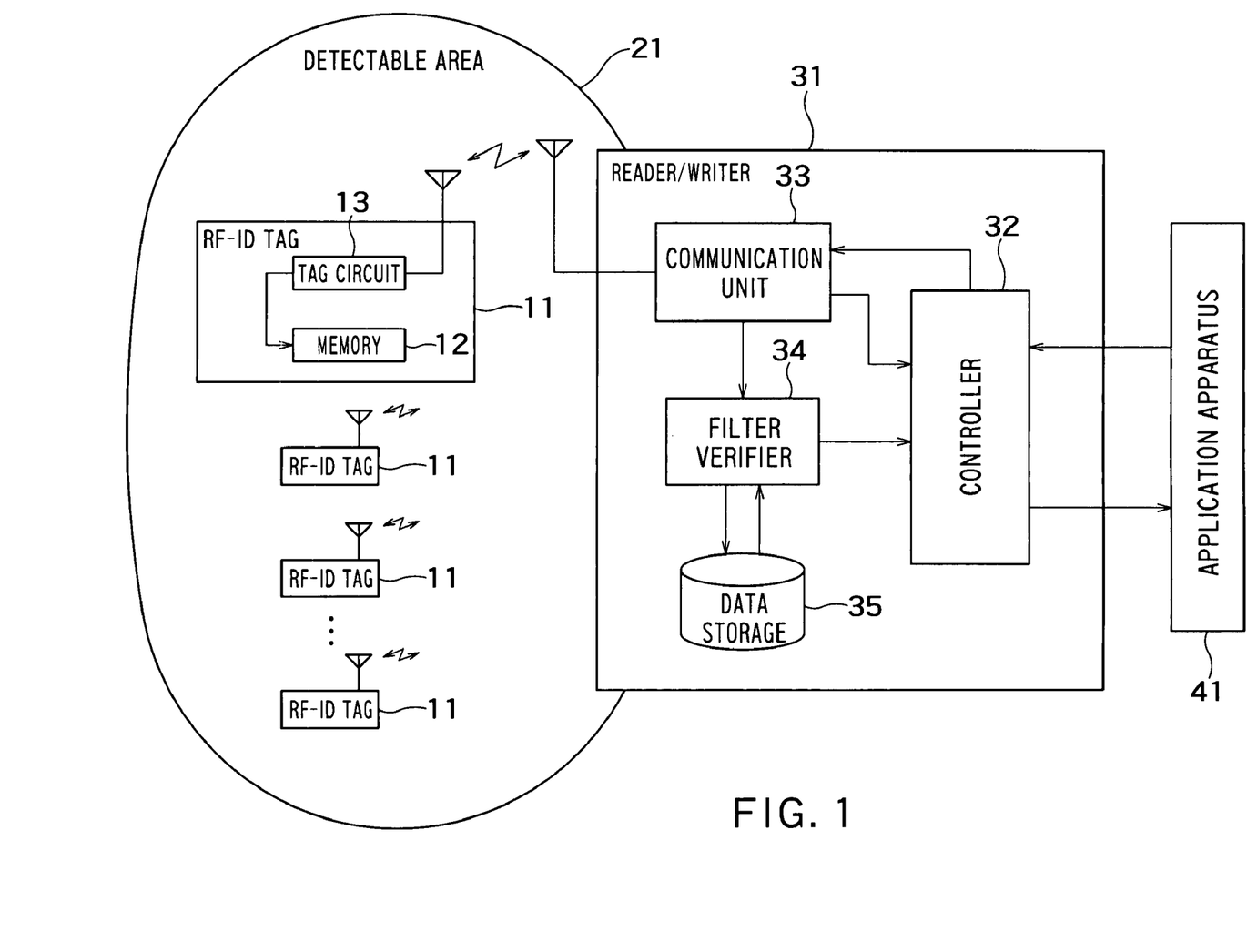
FIG. 1 is a schematic block diagram showing a configuration of a wireless tag system according to an embodiment of the present invention.

FIG. 1 is a schematic block diagram showing a configuration of a wireless tag system according to an embodiment of the present invention.

This wireless tag system includes a plurality of RF-ID tags 11, a reader/writer 31 which communicates with an RF-ID tag 11 existing in a detectable area 21, and an application apparatus 41 which orders the reader/writer 31 to detect RF-ID tags existing in the detectable area 21.

Each of the RF-ID tags 11 includes a memory 12, and a tag circuit 13 which reads out data from the memory 12 in response to a read request issued by the reader/writer 31 and returns the data thus read out to the reader/writer 31.

A tag ID (an example of tag information) uniquely assigned to the RF-ID tag 11, a bloom filter (described later) generated from the tag ID, and a CRC or a parity generated from a bit string in the bloom filter are stored in the memory 12. Besides, commodity information (such as sizes of accessories) of a commodity to which the RF-ID tag 11 is attached may be stored in the memory 12.

Upon receiving a read request from the reader/writer 31, the tag circuit 13 in the RF-ID tag 11 reads out the bloom filter and the CRC, the parity or the ID tag stored in the memory 12, conducts coding and modulation on them, and transmits a result to the reader/writer 31. The tag circuit 13 may transmit only the bloom filter. As the modulation technique at the time of the transmission, for example, the ASK, FSK or the like can be used.

Figure 2A:
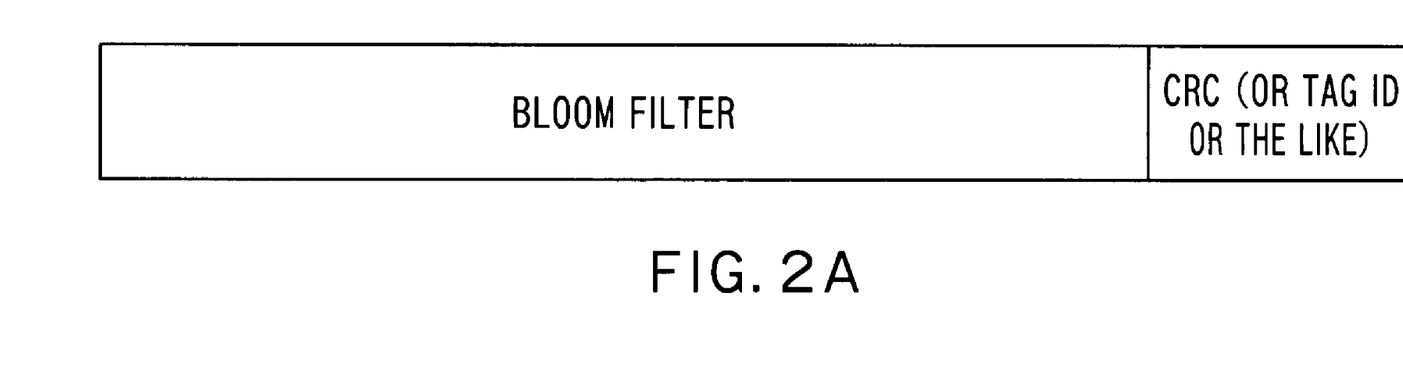
FIG. 2A shows an example of contents of transmission data.
Figure 2B:
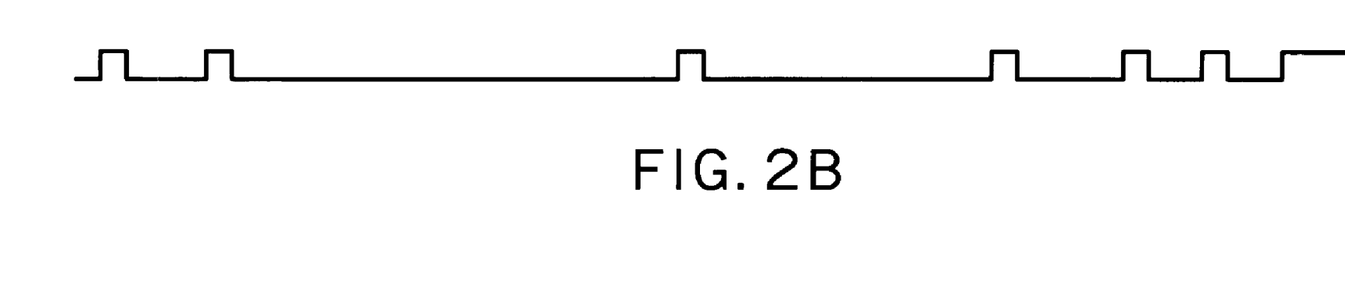
FIG. 2B shows an example of a coded signal obtained by applying NRZ coding to data shown in FIG. 2A.

FIG. 2A shows an example of data contents transmitted from the RF-ID tag 11 to the reader/writer 31. FIG. 2B shows a coded signal generated by applying NRZ coding to the data shown in FIG. 2A. The coded signal is further modulated, and transmitted to the reader/writer 31.

The coding scheme is required to become an OR operation bit by bit when transmission signal of plural bits is collided with another transmission signal of plural bits. The NRZ coding scheme can be provided with this property. Incidentally, in FIGS. 2A and 2B, a transmission direction of the data may be from either of the bloom filter side and the CRC (or tag ID) side.

The bloom filter will now be described briefly. As for details of the bloom filter, see Broder et al., Network Applications of Bloom Filters: A Survey.

The bloom filter is a filter for stochastically inspecting by applying the hash function whether certain arbitrary data "d" is contained in a data aggregate "X".

It is possible to "verify" whether certain data d is contained in the data aggregate X, by conducting a predetermined procedure on a bloom filter BF-X generated from the data aggregate X. As a result of the procedure, results of two ways, i.e., "positive" and "negative" are obtained.

If the "negative" result is obtained, there is no possibility that the data d is contained in the data aggregate X. On the other hand, if the "positive" result is obtained, the possibility that the data d is contained in the data aggregate X is high. In other words, even if the "positive" result is obtained, the data d is not necessarily contained in the data aggregate X. If a "positive" result is obtained although the data d is not contained in the data aggregate X, it is called "false positive."

Hereafter, a method for generating a bloom filter having such a property will be described.

The following parameters are used to generate a bloom filter.

m: length of filter k: the number of times of repetition (the number of prepared hash functions)

(1) Generation procedure of bloom filter

1. Prepare a bit string F having a length m, and set all bits to 0.

2. Prepare independent hash functions hn( ) (where n=1, . . . , k) having a value range [1, m]. By providing the same hash algorithm with different constants (salt), k independent hash functions hn( ) may be prepared.

3. Conduct the following processing on elements xi in an input data aggregate X.

(a) Set p=1.

(b) If p>k, finish.

(c) Calculate idx=hp(xi) using the hash function hp( ) prepared in 2.

(d) Set an idx-th bit in the bit string F to 1 (if 1 is already set, keep the bit value at 1).

(e) Add 1 to p.

(f) Return to (b) in the procedure 3.

In short, find k hash values idx from k hash functions, for each of elements xi in the input data aggregate X, and generate a bloom filter by setting the idx-th bit in the bit string F to 1.

Subsequently, verification (filter verification) whether the data d is contained in the input data aggregate X is conducted according to the following procedure.

(2) Procedure of filter verification

1. Set p=1.

2. If p>k, return "positive."

3. Calculate idx=hp(d) for data d to be verified.

4. Check the idx-th bit in the bit string F. If the idx-th bit is 0, return "negative."

5. Add 1 to p.

6. Return to the procedure 2.

In short, data d is input to k hash functions. If bits in all bit positions corresponding to the outputs idx of respective hash functions are 1, "positive" is returned. If at least any of bits in bit positions corresponding to the outputs idx of respective hash functions is 0, "negative" is returned.

The "false positive" occurs, i.e., "positive" is returned in the "procedure 2." although the data d is not contained in the data aggregate X, when all bits in bit positions corresponding to the outputs idx of respective hash functions happen to be 1. For example, it is now supposed that there is a bloom filter BF-Y generated from a data aggregate Y formed of data A and data B. Positions of 1 in this bloom filter BF-Y, i.e., positions obtained by performing an OR-ing function on positions of 1 based on data A and positions of 1 based on data B include positions of 1 based on data d in some cases. If verification of data d is conducted using the bloom filter BF-Y in such a case, the false positive occurs.

A false positive occurrence probability Rfp is represented as $Rfp=s^k$ . . . (equation 1), where s is a saturation which represents a ratio of bits of 1 to all bits in the bloom filter. For example, if $k=10$ and $s=0.5$, then $Rfp=0.5^{10}$.

As described above, a bloom filter generated from a tag ID of an RF-ID tag 11 is stored in the memory 12 in the RF-ID tag 11. In other words, this bloom filter has been generated from one data (tag ID). By the way, in generation of the bloom filter from the tag ID, it is desirable to set the number k of prepared hash functions equal to a value smaller than a filter length m. In this case, almost all bits in the generated bloom filter become 0.

Upon receiving an RF-ID tag detection order from the application apparatus 41 shown in FIG. 1, a controller 32 in the reader/writer 31 orders a communication unit 33, which communicates with RF-ID tags 11, to read out data from RF-ID tags 11 in the detectable area 21.

The communication unit 33 transmits a read request signal to the detectable area 21. The communication unit 33 receives a data signal returned from a signal RF-ID tag 11 which has received the read request signal or data signals returned from a plurality of RF-ID tags 11 which have received the read request signal. The communication unit 33 demodulates and decodes the received data signal. If data signals are returned from a plurality of RF-ID tags 11, i.e., if the communication unit 33 receives data signals simultaneously from a plurality of RF-ID tags 11, collision occurs.

FIGS. 3A to 3D are diagrams showing collision caused when responses are sent simultaneously from two RF-ID tags (first and second RF-ID tags) 11.

Figures 3A, 3B:
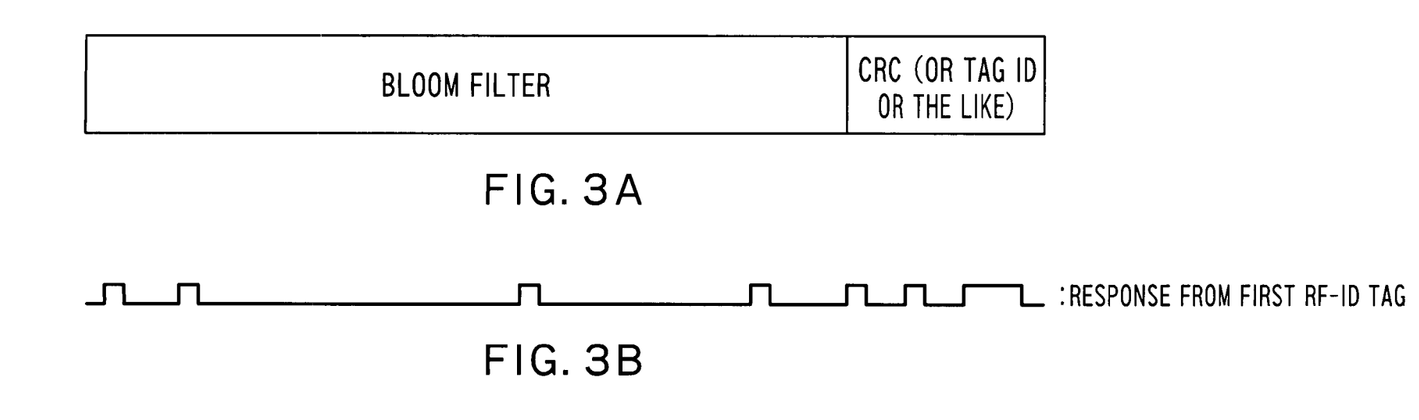
FIGS. 3 are diagrams showing collision caused when responses are sent simultaneously from a plurality of RF-ID tags.
Figure 3C:
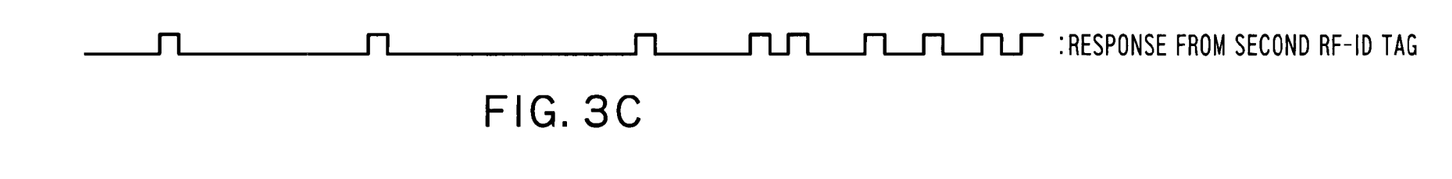
Figure 3D:
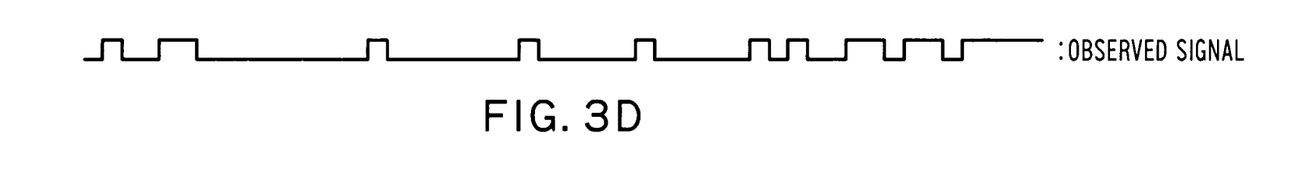

FIG. 3A shows contents of transmission data of each RF-ID tag. FIG. 3B shows a coded signal generated by conducting NRZ coding on transmission data of the first RF-ID tag. FIG. 3C shows a coded signal generated by conducting NRZ coding on transmission data of the second RF-ID tag. FIG. 3D shows a coded signal (observation signal) obtained by demodulation a collision signal received in the communication unit 33.

As appreciated from FIG. 3D, the coded signal obtained in the communication unit 33 becomes an OR-compounded value of the NRZ coded signal transmitted from the first RF-ID tag and the NRZ coded signal transmitted from the second RF-ID tag.

In the ensuing description, it is supposed that the communication unit 33 receives data from a single RF-ID tag 11 or receives data simultaneously from a plurality of RF-ID tags 11. And it is supposed that the received data is formed of a bloom filter and a CRC, The communication unit 33 inspects whether the CRC (received CRC) in received data (data sent from a single RF-ID tag 11, or composite data obtained by performing an OR-compounding function on data sent from a plurality of RF-ID tags 11) matches a bloom filter (received filter) in the received data.

If matching is found, the communication unit 33 judges that data has been received from a single RF-ID tag 11 (collision has not occurred). If matching is not found, the communication unit judges that data have been received from a plurality of RF-ID tags 11 (i.e., that collision has occurred). If the communication unit 33 judges that data have been received from a plurality of RF-ID tags 11, the received CRC becomes an OR compounded value (composite CRC) of CRCs sent from the RF-ID tags 11 and the received filter becomes an OR compounded value (composite filter) of bloom filters from respective RF-ID tags 11. The communication unit 33 gives a notice as to whether collision has occurred to the controller 32, and gives a notice as to whether collision has occurred and the received filter to a filter verifier 34.

A data storage 35 in the reader/writer 31 stores a plurality of already known tag IDs therein. Bloom filters generated respectively from the tag IDs are stored in the data storage 35 so as to be respectively associated with the tag IDs. By the way, when producing RF-ID tags, it is desirable to manage so as to exclude RF-ID tags having tag IDs from which absolutely the same filter is generated.

Upon receiving a notice that collision is occurring from the communication unit 33, the filter verifier 34 verifies tag IDs in the data storage 35 with the received filter (composite filter) in accordance with the above-described filter verification procedure. The filter verifier 34 detects all tag IDs that are positive as a result of the verification, and delivers the detected tag IDs to the controller 32.

At the time of the filter verification, the filter verifier 34 stores bit positions referred to in the composite filter. After the filter verification, the filter verifier 34 inspects whether a bit position that has not been referred to in the composite filter is present. If such a bit position is present, the filter verifier 34 inspects whether the bit position has 1 set therein. If the bit position has 1 set therein, the filter verifier 34 may judge that an RF-ID tag 11 having an unknown tag ID is present in the detectable area 21. If hash collision occurs, however, there is a possibility that the presence of a RF-ID tag 11 having an unknown tag ID will be hidden, even if it is present. In other words, if an OR composite value of a plurality of bloom filters from a plurality of already known tag IDs includes a bloom filter from a certain unknown tag ID, presence of an RF-ID tag having an unknown tag ID is hidden even if it is present. Upon judging that an RF-ID tag 11 having an unknown tag ID is present, the filter verifier 34 may send a notice to that effect to the controller 32.

On the other hand, upon receiving the notice that collision has not occurred from the communication unit 33, the filter verifier 34 detects a tag ID having the same filter as the received filter from the data storage 35, and delivers the detected tag ID to the controller 32. By the way, in the same way as the foregoing description, the filter verifier 34 may verify tag IDs in the data storage 35 with the received filter, detect a tag ID that is positive in the result of verification, and deliver the detected tag to the controller 32.

The controller 32 delivers the tag ID received from the filter verifier 34 and whether collision has occurred received from the communication unit 33, to the application apparatus 41. Upon receiving the notice that an RF-ID tag 11 having an unknown tag ID is present from the filter verifier 34, the controller 32 may deliver a notice to that effect to the application apparatus 41.

Heretofore, an example in which data read out from the RF-ID tag 11 is formed of a bloom filter and a CRC has been described. The case where data read out from the RF-ID tag 11 is a bloom filter and a tag ID will be described hereafter.

The communication unit 33 delivers a received filter and a received tag ID in data from a single RF-ID tag 11 or composite data obtained by performing an OR-compounding function on data from a plurality of RF-ID tags 11, to the filter verifier 34.

The filter verifier 34 inspects whether the same tag ID as the received tag ID is present in the data storage 35. If the same tag ID as the received tag ID is not present, the filter verifier judges that collision has occurred. In this case, the filter verifier 34 verifies tag IDs in the data storage 35 for the received filter. The filter verifier 34 delivers all tag IDs found to be positive as a result of the verification and a notice that collision has occurred, to the controller 32.

On the other hand, if the same tag ID as the received tag ID is present in the data storage 35, the filter verifier judges that collision has not occurred. In this case, the filter verifier 34 delivers this tag ID and a notice that collision has not occurred, to the controller 32. As a result, it is not necessary to conduct filter verification, and consequently the processing can be made faster.

The controller 32 returns the tag ID(s) received from the filter verifier 34 and whether collision has occurred, to the application apparatus 41.

In the filter verification in the filter verifier 34, a false positive might occur as described above. As described above (the equation 1), the false positive occurrence probability Rfp can be calculated as $Rfp = s^k$ using the saturation (the occupancy ratio of 1) s in the received filter (for example, the composite filter) and the number k of hash functions used when generating the bloom filter.

In the present embodiment, therefore, it is judged whether the quality of the received filter satisfies the requirement of the application, by using the false positive occurrence probability Rfp. Specifically, the application apparatus 41 supplies an acceptable number of false positives ANFP (threshold) to the reader/writer 31. It is judged whether the quality of the received filter satisfies the requirement of the application on the basis of the acceptable number of false positives ANFP, the number (N) of already known tag IDs in the data storage 35, and the false positive occurrence probability Rfp. Hereafter, this will be described in more detail.

The controller 32 receives the acceptable number of false positives ANFP from the application apparatus 41.

Furthermore, the controller 32 receives a received filter from the filter verifier 34, and calculates the false positive occurrence probability Rfp according to the (equation 1). A value of k is retained previously in, for example, the filter verifier 34.

The controller 32 previously retains the number N of tag IDs stored in the data storage 35, or receives the number N of tag IDs from the filter verifier 34.

The controller 32 obtains an expected value E (=Rfp×N) of false positive occurrence by multiplying the calculated false positive occurrence probability Rfp by the number N of the already known tag IDs. The controller 32 compares the calculated expected value E with the acceptable number of false positives ANFP. If the calculated expected value E exceeds the acceptable number of false positives ANFP, the number of RF-ID tags responding simultaneously is restricted using the existing collision avoiding technique or a technique similar to this. For example, the reader/writer 31 transmits a read request signal to request only an RF-ID tag having 0 in a specific bit (for example, the most significant bit) in tag ID to respond, in order to lower the saturation s of the received filter. As a result, the number of responding RF-ID tags can be made nearly half of the RF-ID tags existing in the detectable area. Therefore, a received filter having a high quality can be obtained. If the quality of the received filter is extremely poor, the number of responding RF-ID tags may be further narrowed down by providing a plurality of bits with conditions.

As the number of bits provided with conditions increases, a greater number of times of readout becomes necessary. For example, if a single bit is provided with a condition, readout must be conducted twice. If the number of bits provided with conditions is two, the number of times of readout becomes four. If the number of bits provided with conditions is three, the number of times of readout becomes eight. In other words, if the number of bits provided with conditions is too large, there is a possibility that the high speed in RF-ID tag detection which is an advantage of the present embodiment will be hampered. The length of the bloom filter retained by each RF-ID tag is made sufficiently long, and thereby, even if simultaneous readout is conducted from a sufficiently large number of RF-ID tags, it is desirable to make the saturation of the received filter sufficiently low.

In the present embodiment heretofore described, a bloom filter generated from a tag ID and a CRC (or a tag ID or parity) are read out from an RF-ID tag. Alternatively, a bloom filter generated from commodity information may be stored in the RF-ID tag and the bloom filter and the commodity information (or the CRC or parity) may be read out from the RF-ID tag. In this case, it is necessary to provide a storage storing commodity information of respective RF-ID tags in the reader/writer. This will be described in detail in an embodiment (second example) described later.

Figure 4:
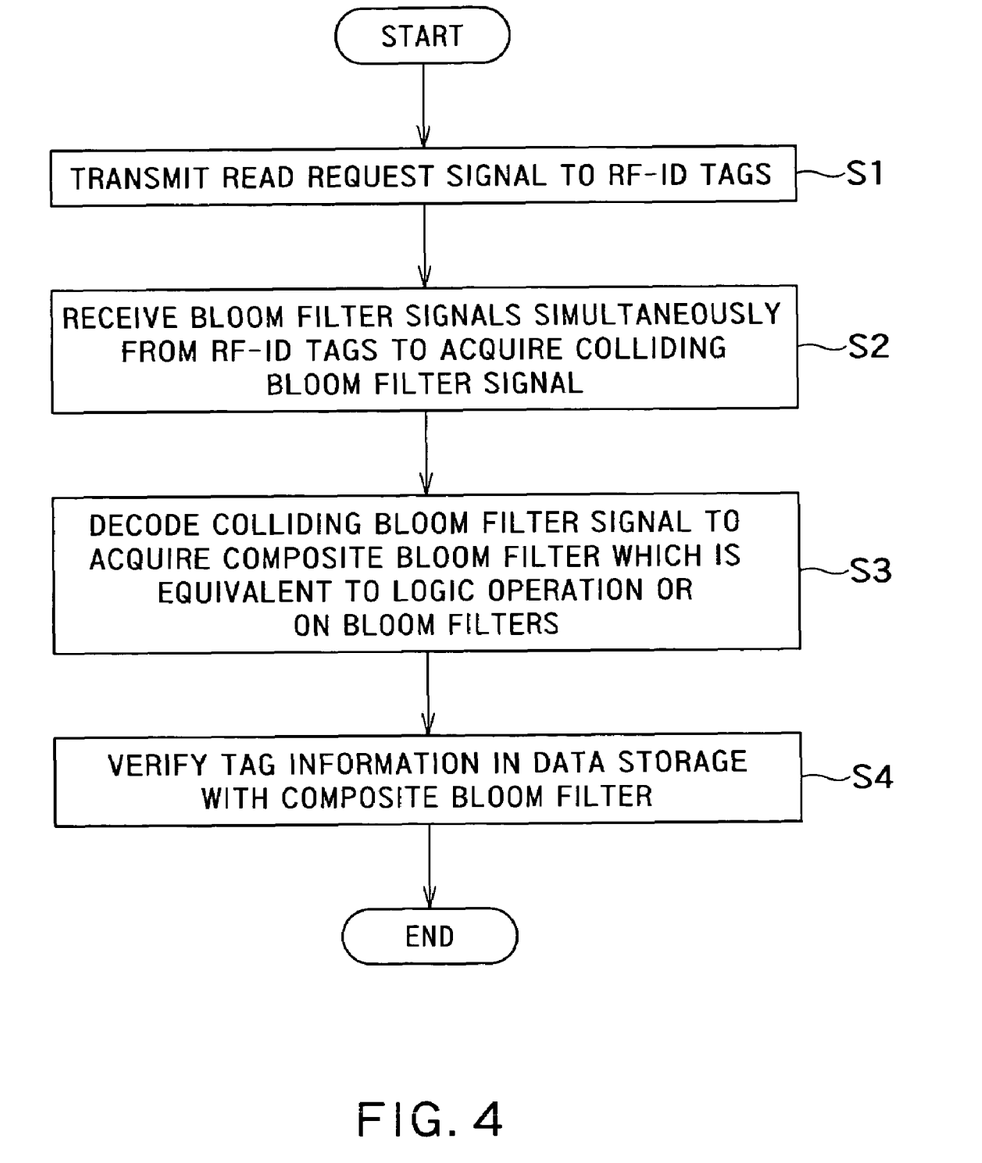
FIG. 4 is a flow chart showing an embodiment of a wireless communication method according to the present invention.

FIG. 4 is a flow chart showing an embodiment of a wireless communication method according to the present invention.

The reader/writer 31 transmits the read request signal to respective RF-ID tags 11 (S1). Each RF-ID tag 11 retains tag information (such as a tag ID or commodity information), and a bloom filter generated from the tag information according to a bloom filter algorithm.

The reader/writer 31 receives bloom filter signals simultaneously from RF-ID tags 11, and acquires colliding bloom filter signal (S2).

The reader/writer 31 decodes the colliding bloom filter signal to acquire a composite bloom filter which is equivalent to the logic operation OR on the bloom filters (S3).

The reader/writer 31 verifies tag information in the data storage 35 with the composite bloom filter (S4).

The functions of reader/writer 31 in the steps of S1 to S4 may be implemented by cause a computer to execute instructions to perform the steps of S1 to S4. And, a computer program including the instructions may be stored in a computer readable medium.

Hereafter, two representative embodiments of the present invention will be described.

FIRST EXAMPLE

Example of Article Inspection Using Readout of Pallet ID

In the process of commodity circulation, the article inspection is one of important works requiring much labor. On the other hand, a demand for cost reduction and speed increase at stages of commodity circulation is very strong. A method of conducting the inspection using RF-ID tags will now be described. For example, when conducting inspection of parts, RF-ID tags are stored in pallets in which parts are stored.

If parts and pallets are sufficiently large, the number of tags the reader/writer can read simultaneously is small. Even if readout is conducted individually, therefore, it does not take much time.

On the other hand, if the pallet size is small and the number of RF-ID tags that can be read simultaneously is relatively large (for example, approximately 100) as in the case of electronic parts, it takes much time for readout in the conventional anti-collision procedure.

In the case of inspection of pallets, the reader/writer previously knows which RF-ID tags should be present in the current detectable area. If RF-ID tags storing bloom filters are stuck on pallets and the present invention is applied, it is possible to verify owing to the anti-collision effect of the present invention whether all RF-ID tags that should be present in the detectable area of the reader/writer are complete, by conducting read operation a small number of times (for example, once).

Supposing each tag ID to have 64 bits, a length m of a bloom filter generated from the tag ID to be 2,048 bits, the number k of hash functions to be 10, and the number n of RF-ID tags simultaneously read out to be 100, the occupation ratio of bit 0 in the composite filter becomes as follows:

$$\left(\frac{m-k}{m}\right)^n = \left(\frac{2048-10}{2048}\right)^{100} \cong 61\%$$

On the basis of this result and (the equation 1), the false positive occurrence probability Rfp is calculated as follows:

$$Rfp = s^k = \left[1.0 - \left(\frac{2038}{2048}\right)^{100}\right]^{10} \cong 7.5 \times 10^{-5}$$

If the false positive occurrence probability does not satisfy the desired precision, it can be coped with by conducting contrivance on the whole system such as providing bits with conditions and thereby dividing the readout at least twice or reducing the number of bits read out at a time, as described with reference to the embodiment of the present invention.

SECOND EXAMPLE

Example of Shoe Store

A retail store of shoes is supposed. In the shoe store, it is necessary to prepare various kinds of shoes having various sizes in a warehouse of the store. For example, it is supposed that 1,000 pairs of shoes are stored in the warehouse of the store and order of goods and selling are repeated.

Upon inquiring a customer about the size, a clerk inputs information concerning the model and size of shoes to an electronic tag reader (reader/writer) combined with a PDA (application apparatus). At this time, the model and size of shoes may be read from an RF-ID tag attached to shoes exhibited on a store front. Thereafter, the clerk having an electronic tag reader moves to the store warehouse.

An RF-ID tag is stuck on each of shoe boxes in the store warehouse. (ID, model, and size) are recorded on the RF-ID tag. A bloom filter generated from (model and size) in the combination is recorded on the RF-ID tag.

In response to a read request from the electronic tag reader, each RF-ID tag returns a combination of a retained bloom filter and (model and size) that has functioned as the generation source of the bloom filter.

In the store warehouse, the electronic tag reader issues this read request once or a plurality of times, and verifies whether an RF-ID tag having a target (model and size) is present in the readout range (detectable range) of the electronic tag reader. If an RF-ID tag having a target (model and size) is present, the electronic tag reader notifies the clerk to that effect. At this time, it is also possible to gradually lower the output level of the electronic tag reader, narrow the readout range, and thereby further narrow down the presence place of an RF-ID tag having a target (model and size). By the way, the RF-ID tag attached to the shoe box can become a target of readout at a POS register as well at the time of payment.

According to the embodiment of the present invention, a composite bloom filter obtained by performing OR-ing compounding on bloom filters retained on RF-ID tags is acquired from simultaneous response signals of a plurality of RF-ID tags, and previously retained tag information (such as the tag ID and commodity information) is verified with respect to this composite bloom filter, as heretofore described. Therefore, RF-ID tags existing in the detectable area can be detected in a short time.

Furthermore, according to the present embodiment, an error detection code, such as a CRC, or a tag ID is added to a bloom filter, and a combination of the bloom filter and the error detection code is transmitted to the reader/writer. Therefore, the reader/writer can simply detect whether collision has occurred.

Furthermore, according to the present embodiment, the false positive occurrence probability is calculated. If the calculated false positive occurrence probability does not satisfy the acceptable number of false positives, bits are provided with conditions and readout is conducted. Therefore, data readout becomes possible while maintaining a desired detection precision.

Furthermore, according to the present embodiment, it is inspected whether a bit 1 is present in bit positions that have not been referred to in the bloom filter at the time of filter verification. Therefore, it can be judged whether an RF-ID tag having tag information other than previously retained tag information is present in the detectable area.

What is claimed is:

1. A wireless tag reader communicating with a plurality of wireless tags each of which retains tag information piece and a bloom filter generated from the tag information piece on the basis of a bloom filter algorithm, the wireless tag reader comprising:
   a transmitter configured to transmit a read request signal simultaneously to the wireless tags to request the wireless tags to read out the bloom filters;
   a receiver configured to receive bloom filter signals simultaneously from the wireless tags to acquire a colliding bloom filter signal;
   a decoder configured to decode the colliding bloom filter signal to acquire a composite bloom filter which is equivalent to logic operation OR on the bloom filters;
   a data storage configured to store tag information pieces; and
   a filter verifier configured to verify each of tag information pieces in the data storage with the composite bloom filter to detect tag information pieces for which a verification result is positive or negative.

2. The wireless tag reader according to claim 1, further comprising a calculator configured to calculate an occupation ratio of a predetermined bit in a bit string of the composite bloom filter, and configured to calculate a false positive occurrence possibility on the basis of the occupation ratio of the predetermined bit and the number of hash functions used to generate the bloom filter.

3. The wireless tag reader according to claim 2, wherein if the false positive occurrence possibility does not satisfy a threshold, the transmitter transmits a read request signal which requests only wireless tags having tag information pieces which satisfies certain selection condition to return responses.

4. The wireless tag reader according to claim 1, wherein if a predetermined bit is set in bit positions which have not been referred to in the composite bloom filter at time of the verification of the tag information pieces, the filter verifier determines that a wireless tag having tag information piece other than tag information pieces stored in the data storage is present in the plurality of wireless tags.

5. The wireless tag reader according to claim 1, wherein the tag information piece includes one of a tag ID and commodity information of a commodity to which the wireless tag is attached.

6. The wireless tag reader according to claim 1, wherein
the bloom filter signals to be transmitted from the wireless tags are coded using an NRZ coding scheme, and
the decoder conducts NRZ decoding on the colliding bloom filter signal.

7. A wireless tag system comprising a plurality of wireless tags and a wireless tag reader communicating with the wireless tags,
each of the wireless tags including:
a memory configured to store tag information piece and a bloom filter generated from the tag information piece by using a bloom filter algorithm; and
a responder configured to, in response to a read request signal sent from the wireless tag reader, code the bloom filter stored in the memory by using a certain coding scheme to generate a bloom filter signal, and transmits the generated bloom filter signal to the wireless tag reader, and
the wireless tag reader including:
a transmitter configured to transmit a read request signal simultaneously to the wireless tags to request the wireless tags to read out the bloom filters;
a receiver configured to receive bloom filter signals simultaneously from the wireless tags to acquire a colliding bloom filter signal;
a decoder configured to decode the colliding bloom filter signal to acquire a composite bloom filter which is equivalent to logic operation OR on the bloom filters;
a data storage configured to store tag information pieces; and
a filter verifier configured to verify each of tag information pieces in the data storage with the composite bloom filter to detect tag information pieces for which a verification result is positive or negative.

8. A computer readable medium storing a computer program for causing a computer, capable of communicating with a plurality of wireless tags each of which retains tag information piece and a bloom filter generated from the tag information piece on the basis of a bloom filter algorithm to execute instructions, to perform steps of:
transmitting a read request signal simultaneously to the wireless tags to request the wireless tags to read out the bloom filters;
receiving bloom filter signals simultaneously from the wireless tags to acquire a colliding bloom filter signal;
decoding the colliding bloom filter signal to acquire a composite bloom filter which is equivalent to logic operation OR on the bloom filters; and
verifying previously given tag information pieces with the composite bloom filter to detect tag information pieces for which a verification result is positive or negative.

9. The computer readable medium according to claim 8, storing the computer program for causing the computer to further execute instructions to perform steps of:
calculating an occupation ratio of a predetermined bit in a bit string of the composite bloom filter; and
calculating a false positive occurrence possibility on the basis of the occupation ratio of the predetermined bit and the number of hash functions used to generate the bloom filter.

10. The computer readable medium according to claim 9, storing the computer program for causing the computer to further execute instructions to perform steps of:
checking whether or not the false positive occurrence possibility satisfies a threshold;
if the false positive occurrence possibility does not satisfy the threshold, transmitting a read request signal to request only wireless tags having tag information pieces which satisfies certain selection condition to return responses.

11. The computer readable medium according to claim 8, storing the computer program for causing the computer to further execute instructions to perform steps of:
checking whether or not a predetermined bit is set in bit positions which have not been referred to in the composite bloom filter at time of verification of the tag information pieces,
if the predetermined bit is set, determining that a wireless tag having unknown tag information piece is present in the plurality of wireless tags.

12. The computer readable medium according to claim 8, wherein the tag information piece includes one of a tag ID and commodity information of a commodity to which the wireless tag is attached.

13. The computer readable medium according to claim 8 wherein
the bloom filter signals to be transmitted from the wireless tags are coded using an NRZ coding scheme, and
NRZ decoding is conducted on the colliding bloom filter signal.

14. A wireless communication method used to communicate with a plurality of wireless tags each of which retains tag information piece and a bloom filter generated from the tag information piece on the basis of a bloom filter algorithm, the wireless communication method comprising:
transmitting a read request signal simultaneously to the wireless tags;
receiving bloom filter signals simultaneously from the wireless tags to acquire a colliding bloom filter signal;
decoding the colliding bloom filter signal to acquire a composite bloom filter which is equivalent to logic operation OR on the bloom filters; and
verifying previously given tag information pieces with the composite bloom filter to detect tag information pieces for which a verification result is positive or negative.

15. The wireless communication method according to claim 14, further comprising:
calculating an occupation ratio of a predetermined bit in a bit string of the composite bloom filter; and
calculating a false positive occurrence possibility on the basis of the occupation ratio of the predetermined bit and the number of hash functions used to generate the bloom filter.

16. The wireless communication method according to claim 15, further comprising:

checking whether or not the false positive occurrence possibility satisfies a threshold;

if the false positive occurrence possibility does not satisfy the threshold, transmitting a read request signal to request only wireless tags having tag information pieces which satisfies certain selection condition to return responses.

17. The wireless communication method according to claim 14, further comprising:

checking whether or not a predetermined bit is set in bit positions which have not been referred to in the composite bloom filter at time of verification of the tag information pieces, if the predetermined bit is set, determining that a wireless tag having unknown tag information piece is present in the plurality of wireless tags.

18. The wireless communication method according to claim 14, wherein the tag information piece includes one of a tag ID and commodity information of a commodity to which the wireless tag is attached.

19. The wireless communication method according to claim 14, wherein the bloom filter signals to be transmitted from the wireless tags are coded using an NRZ coding scheme, and NRZ decoding is conducted on the colliding bloom filter signal.

* * * * *